Patented Jan. 30, 1951

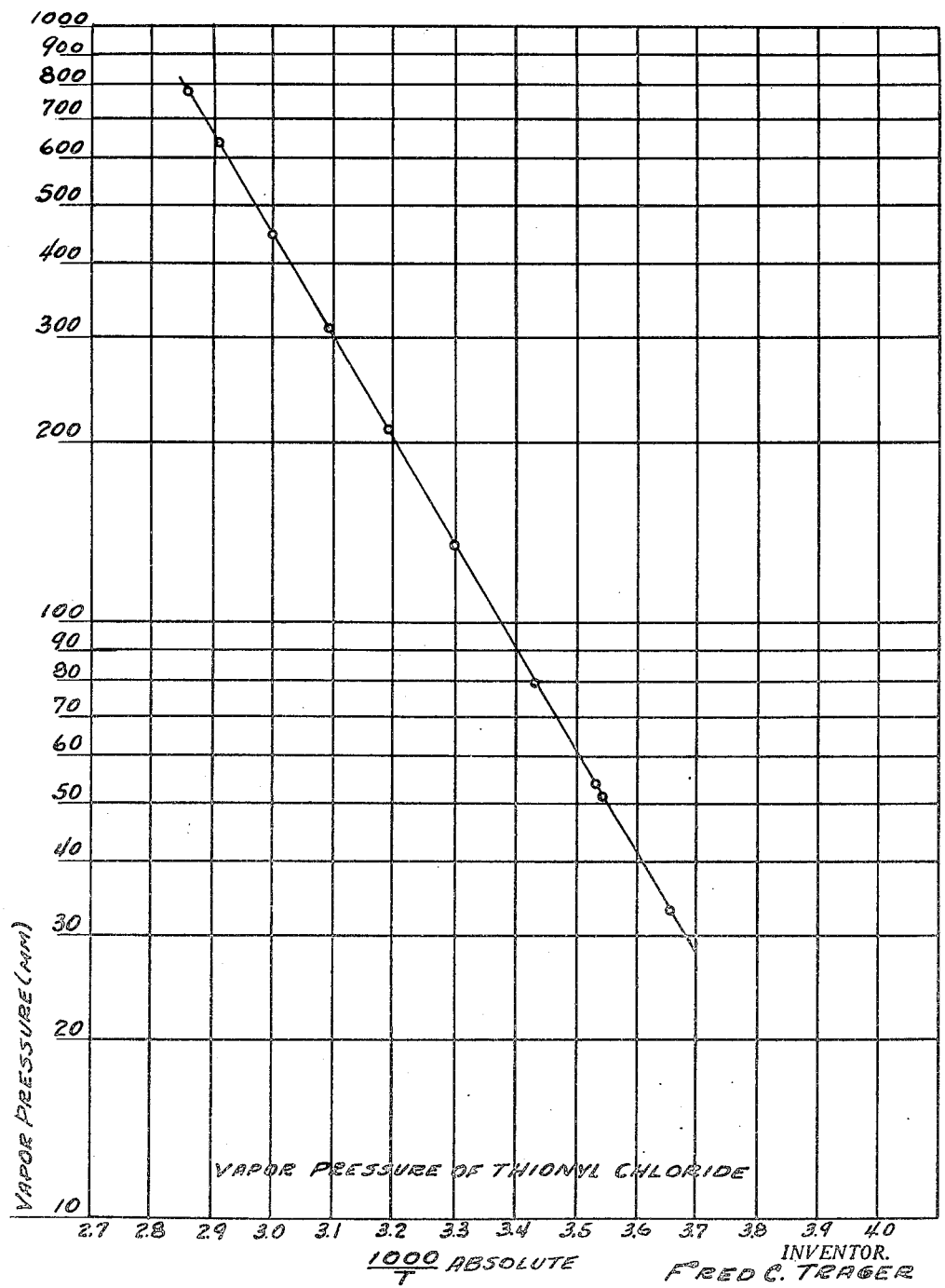

2,539,679

UNITED STATES PATENT OFFICE 2,539,679

PURIFICATION OF THIONYL CHLORIDE

Fred C. Trager, Akron, Ohio, assignor to Pittsburgh Plate Glass Company, Allegheny County, Pa., a corporation of Pennsylvania Application February 16, 1946, Serial No. 648,151

7 Claims. (Cl. 202—57)

This invention relates to purification of thionyl chloride and more particularly to a process of removing sulphur chlorides from crude thionyl chloride contaminated therewith.

Thionyl chloride heretofore available in carboy lots or larger quantities has been contaminated with chlorides of sulphur, principally the mono- and di-chlorides. The product of one commercial process is contaminated with sulphur chlorides and sulphuryl chloride as well.

According to the invention described and claimed in the application of Alphonse Pechukas entitled "Manufacturing Thionyl Chloride," Serial No. 648,152, and filed concurrently herewith, which issued as U. S. Patent 2,431,823, December 2, 1947, a liquid reaction product containing thionyl chloride in major proportions is obtained by a vapor phase treatment of sulphur chloride with sulphur dioxide and chlorine at elevated temperatures in the presence of activated carbon, followed by cooling and separation of gaseous $SO_2$ and $Cl_2$. The crude liquid thionyl chloride is highly colored and contaminated with sulphur monochloride and dichloride, but is free of sulphuryl chloride.

An object of the present invention is the provision of a process of decolorizing and removing sulphur chlorides from thionyl chloride contaminated therewith.

A further object is the provision of such a process wherein the process of purification removes the sulphur chlorides in economical fashion and in form susceptible of reuse as charging stock in the aforementioned vapor phase process of manufacture.

According to the invention, these and other objects are achieved by distilling the crude thionyl chloride in the presence of sulphur and an iron-containing catalyst; all as hereinafter more fully described.

Pure thionyl chloride is a water-white liquid having a boiling point of 75.9° C. at 760 mm. Hg pressure as determined from vapor pressure measurements summarized in the graph shown in Fig. I.

As aforementioned, commercial processes yield thionyl chloride contaminated with sulphur chlorides which heretofore has been insusceptible of purification except by painstaking and excessively costly operations. The available commercial grade of thionyl chloride varies in color from deep reddish-brown to dark yellow, depending on the degree of contamination with sulphur chlorides.

Attempts have been made to remove the sulphur chlorides by fractional distillation methods. The appreciable difference in boiling points between the dichloride (59° C.) and thionyl chloride, and likewise the monochloride (138° C.) indicates clean cut fractionation can be obtained with conventional distillation apparatus. In practice, however, it is found that an effective separation is impossible with ordinary apparatus. The thionyl chloride fraction always contains substantial quantities of the dichloride.

Based on theoretical considerations, I attempted to distill impure thionyl chloride in the presence of elemental sulphur in the hope of converting any sulphur dichloride present to sulphur monochloride, thus facilitating clean separation of the thionyl chloride, but my initial efforts were unsuccessful. The sulphur added dissolved extremely slowly. On distillation of the solution, a substantial amount of sulphur dichloride was obtained in the first fraction removed. Also, the narrow cut removed at approximately the boiling point of thionyl chloride was contaminated with sulphur dichloride.

During investigation of the problem, I discovered that the presence of a catalytic amount of an iron-containing substance will promote rapid dissolution of elemental sulphur in thionyl chloride containing sulphur chlorides, and will also promote conversion of the dichloride to the monochloride. This enables good separation of relatively pure thionyl chloride by conventional fractional distillation.

Generally speaking, then, the purview of the present invention includes any process wherein thionyl chloride containing a sulphur chloride is distilled in the presence of elemental sulphur and an iron-containing catalyst and purified thionyl chloride is recovered.

In practicing the invention, the amount of elemental sulphur added to the impure solution can be varied in keeping with the degree of contamination of the thionyl chloride. Ordinarily, 5 per cent by weight of the crude mixture is ample to accomplish the purpose. Larger amounts can be employed without impairing the treatment, but are economical. When contamination of the thionyl chloride is not severe, as indicated by slight discoloration only, 3 per cent by weight of sulphur will usually suffice.

The iron-containing catalyst is usually introduced in relatively small, or catalytic amounts, say, less than 1 per cent by weight of the solution. A trace will ordinarily suffice, but rapid dissolution of sulphur and conversion of the dichloride to the monochloride will not take place in the absence of an iron-containing catalyst.

I have determined that metallic iron, which is presumably at once attacked by the solution, inorganic iron salts, iron soaps, and iron oxide all exert the desired catalytic effect. Thus, ferric chloride, ferrous chloride, iron stearate, iron naphthenate and the like are all suitable iron-containing catalysts.

My investigation indicates substances other than those containing iron will not operate to promote the rapid dissolution of sulphur and conversion of the dichloride. Thus, attempts to catalyze the desired action of elemental sulphur with aluminum salts and the like have been fruitless.

In the following examples, certain detailed embodiments of the invention are illustrated. The figures given for the purity of the sample are derived from an analysis consisting in placing a bulbed .2 gm. sample of thionyl chloride in 150 cc. of 2.5 per cent sodium hydroxide solution, sealing the container, breaking the bulb by vigorous shaking thereby fixing the $SO_2$ as sodium sulphite, thereafter removing the solution thus formed, adding it to an excess of standardized acidified iodine solution, and back-titrating the excess iodine with sodium thiosulphate. The reducing power of the sample thus determined is calculated as sulphur dioxide derived from thionyl chloride in the sample, the theoretical amount of $SO_2$ in pure thionyl chloride being 53.8 per cent.

Example No. 1

A 163-gram sample of crude thionyl chloride, determined by approximate analysis to contain about 95 per cent thionyl chloride, the balance being sulphur monochloride, was placed in a flask having a ground glass opening, and 5 grams of flowers of sulphur, and a trace of iron stearate was added thereto. The sulphur went into solution almost immediately with the evolution of considerable heat, and the flask was then connected to a packed distillation column 14 inches long filled with Pyrex glass spirals, and fitted with a distilling head to control reflux ratio. On heating, no distillate came over until the temperature at the head of the column reached 74°, and thereafter a fraction was collected boiling between 74 and 76° C., the vapors being passed through a water-cooled condenser and collected in conventional manner. The fraction so obtained weighed 153 grams, was water white in color, and by the method described above, analyzed over 99 per cent thionyl chloride (reducing power calculated as $SO_2=53.7\%$).

Example No. 2

A 163-gram sample of the same lot as that treated in the foregoing example was purified in the same apparatus by the addition of 5 grams of flowers of sulphur and a trace of $Fe_2O_3$, followed by distillation through the column. Again, the vapor started to leave the column at about 74° C. and a fraction was collected boiling up to 76° C. This fraction was likewise water white, and analyzed over 99 per cent pure thionyl chloride by the foregoing method.

Example No. 3

A 163-gram sample of the same lot as before was mixed with 5 grams flowers of sulphur and a trace of anhydrous ferric chloride, and distilled with recovery of a liquid fraction weighing 155 grams, boiling between 74 and 76° C., and of a very slightly yellow cast. The reducing power of this product as analyzed calculated 53.1 per cent $SO_2$.

In the foregoing examples, the temperatures given are actual readings with uncalibrated thermometers, and without correction for atmospheric conditions. Experiments conducted along the same lines with less careful fractionation yielded products of somewhat less purity as indicated by slightly greater depth of color, but each sample was nevertheless greatly improved in purity and reducing power over the crude mixture originally treated. I attribute the loss of thionyl chloride present in the original samples primarily to the method of handling the sample. In adding the sulphur and iron-containing substance to the liquid to be purified there was some loss before the distillation flask was connected to the column.

Example 4

A sample of crude liquid thionyl chloride undegassed condensate obtained from pilot plant operation of the process described in the aforementioned Pechukas application, Serial No. 648,152, was determined by approximate analysis to contain about 81 per cent thionyl chloride, the remainder consisting of mixed chlorides of sulphur and dissolved gases. To the crude mixture there was added 3 per cent by weight flowers of sulphur and a pinch of anhydrous ferric chloride. When subjected to distillation through a packed column under a pressure of 180 mm. of mercury with the distillation flask suspended in an oil bath maintained at a temperature of 60° C., the sample yielded a fraction boiling at 37.5° C.$\pm 1°$ C. (uncorrected reading), water-white in appearance and analyzing well over 99 per cent pure thionyl chloride. This product remained stable and colorless after storage for several months in a glass bottle exposed on a laboratory shelf.

Analysis of the residues remaining after distillation as described in the foregoing examples discloses them to be essentially sulphur monochloride and elemental sulphur, useful as charging materials in the conversion process described in the aforesaid application of Alphonse Pechukas.

I have treated impure thionyl chloride obtained from available sources by the method of the invention where the impure product contained sulphuryl chloride in addition to sulphur mono- and di-chloride. The process of my invention removes the sulphur chlorides but not the sulphuryl chloride, leaving a purified product of water-white appearance containing only sulphuryl chloride as an impurity.

What I claim is:

1. A process of purifying thionyl chloride contaminated with sulphur chloride which comprises adding an iron-containing catalyst to the thionyl chloride, distilling the impure thionyl chloride in the presence of elemental sulfur and the iron-containing catalyst and recovering purified thionyl chloride as a distillate.

2. A process of purifying thionyl chloride contaminated with sulphur chloride which comprises adding an iron-containing catalyst to the thionyl chloride distilling the impure thionyl chloride in the presence of a catalytic amount of the iron-containing catalyst and elemental sulfur in excess of the amount required to convert any sulfur dichloride present to the monochloride and recovering purified thionyl chloride as a distillate.

3. A process of purifying thionyl chloride contaminated with sulphur chloride which comprises adding thereto approximately 3 per cent by weight flowers of sulphur and a trace of anhydrous ferric chloride, subjecting the mixture to fractional distillation and recovering purified thionyl chloride as a distillate.

4. A process of purifying thionyl chloride contaminated with mixed chlorides of sulphur which comprises adding thereto about 3 per cent by weight of flowers of sulphur and a trace of an iron-containing catalyst, distilling the mixture so formed and separating and recovering a fraction boiling between 74° C. and 76° C. at atmospheric pressure.

5. A process of purifying thionyl chloride contaminated with sulphur chloride which comprises adding an iron-containing catalyst to the thionyl chloride, introducing elemental sulphur into solution therein, fractionally distilling the solution so formed under reduced pressure of less than ½ atmosphere in the presence of the iron-containing catalyst and recovering a narrow fraction boiling at approximately 75.9° C. at 760 mm. Hg pressure.

6. In purifying off-color thionyl chloride contaminated with sulphur chloride the process which comprises adding ferric chloride to the thionyl chloride, dissolving therein about 3 per cent by weight of elemental sulphur in the presence of the anhydrous ferric chloride, fractionally distilling the mixture so formed under sub-atmospheric pressure while maintaining the distilland at a temperature less than 61° C. and recovering a fraction of colorless thionyl chloride of increased purity.

7. A process of purifying thionyl chloride contaminated with sulphur chloride, which comprises dissolving elemental sulfur in said thionyl chloride in the presence of an iron-containing catalyst, and distilling thionyl chloride from the resulting solution.

FRED C. TRAGER.

REFERENCES CITED

The following references are of record in the file of this patent:

UNITED STATES PATENTS

| Number | Name | Date |
| --- | --- | --- |
| 2,420,623 | Salzenberg | May 13, 1947 |

FOREIGN PATENTS

| Number | Country | Date |
| --- | --- | --- |
| 190,995 | Great Britain | Jan. 18, 1923 |